Nov. 13, 1962    M. M. SHERIFF ET AL    3,063,527
ACCELERATOR PEDAL CONTROLLED FULL POWER
BRAKE SYSTEM FOR VEHICLES
Filed July 25, 1960
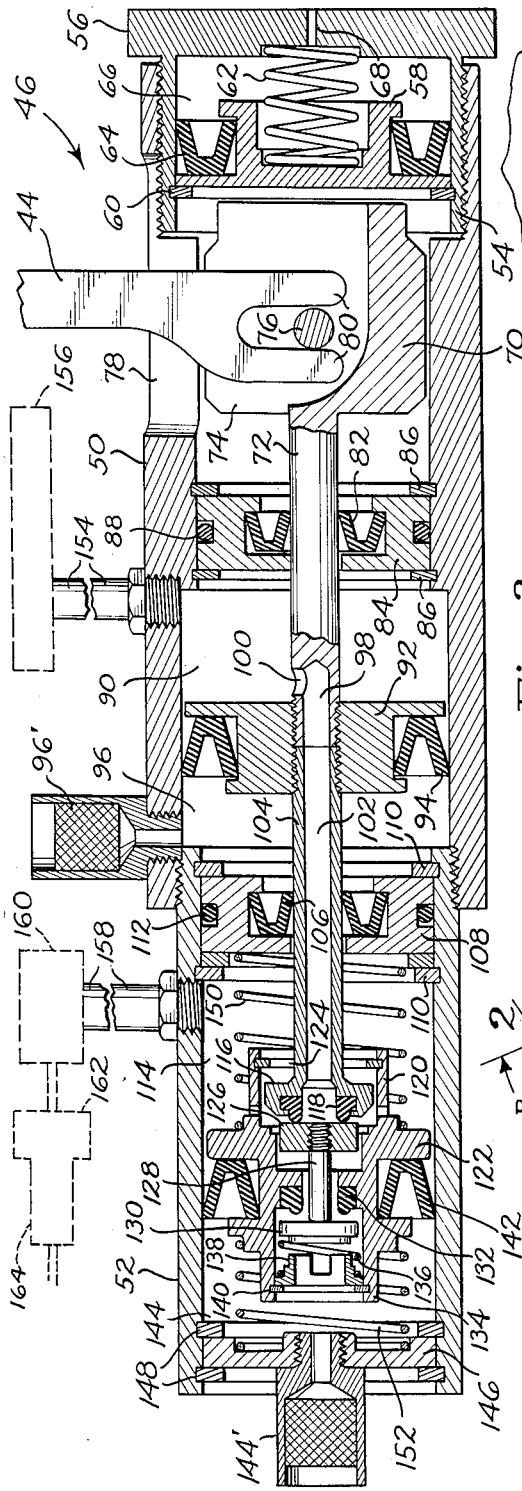
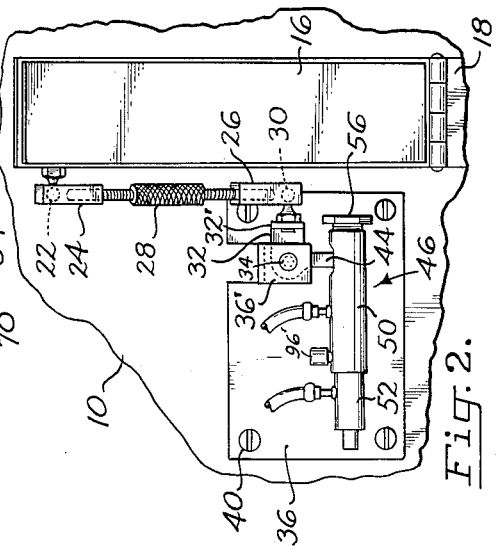
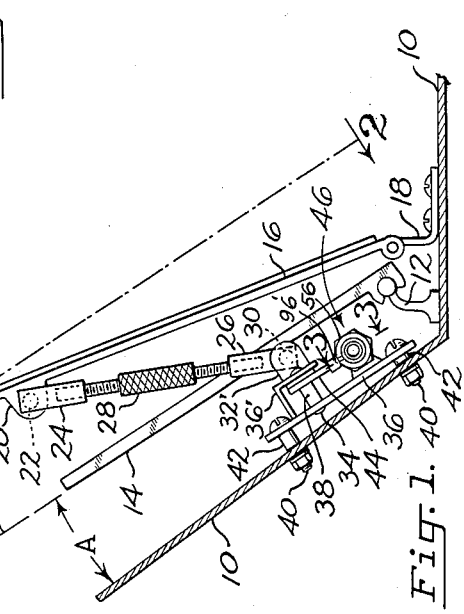
Merle M. Sheriff
Francis J. Holland
INVENTORS
BY *Oliver D. Olson*
*Agent*

United States Patent Office 3,063,527
Patented Nov. 13, 1962

3,063,527
ACCELERATOR PEDAL CONTROLLED FULL POWER BRAKE SYSTEM FOR VEHICLES
Merle M. Sheriff, 725 Deframe, Golden, Colo., and Francis J. Holland, W. Lake Road, Skaneateles, N.Y.
Filed July 25, 1960, Ser. No. 44,942
11 Claims. (Cl. 192—3)

This invention pertains to brake systems for vehicles, and relates particularly to improvements in the accelerator pedal controlled full power brake system for vehicles described in our copending application Serial No. 756,664 filed August 22, 1960.

It is a principal object of the present invention to provide an accelerator pedal controlled full power brake system having improved "feel" to the operator's foot, while minimizing the additional force against the operator's foot throughout the acceleration zone.

Another important object of the present invention is to provide an accelerator pedal controlled full power brake system which utilizes an overlay accelerator pedal mounted above but completely independent of the conventional accelerator pedal.

Still another important object of this invention is the provision of an accelerator pedal controlled full power brake system in which the overlay accelerator pedal is capable of being collapsed onto the conventional accelerator pedal when the accelerator brake system is disconnected temporarily to permit use of the conventional brake system of the vehicle.

A further important object of this invention is the provision of an accelerator pedal controlled full power brake system in which means is included to compensate for the inherent brake fade which develops during high speed or long distance stops.

A still further important object of this invention is the provision of an accelerator pedal controlled full power brake system of such simplified and compact construction as to afford maximum facility and speed of installation on vehicles of all types.

The foregoing and other objects and advantages of this invention will appear from the following detailed description, wherein reference is made to the accompanying drawings in which:

FIG. 1 is a fragmentary view in side elevation showing the cooperative arrangement of the overlay accelerator pedal and valve assembly in association with the conventional accelerator pedal;

FIG. 2 is a fragmentary front elevation as viewed along the line 2—2 in FIG. 1; and FIG. 3 is a sectional view taken along the line 3—3 in FIG. 1 and showing details of internal construction of the sensing valve, other associated components of the brake system being shown in dash lines.

Referring to FIGS. 1 and 2 of the drawing, there is illustrated a portion of the floor board 10 of an automotive vehicle. The floor board supports the base plate 12 on which the conventional accelerator pedal 14 is pivotally mounted adjacent its rearward end. The accelerator pedal is connected through conventional linkage (not shown) through the carburetor or other fuel metering unit of an internal combustion engine.

In accordance with the present invention, an overlay pedal 16 is superimposed above the conventional accelerator pedal and is supported pivotally at its rearward end on the bracket 18 secured to the vehicle floor board. The mounting of the overlay pedal is completely independent of the conventional accelerator pedal, thus requiring no modification of the latter for the installation of the brake system of this invention.

A depending flange 20 adjacent the forward end of the overlay pedal supports a laterally projecting ball 22 which is received rotatably in a socket provided in the forward section 24 of a turnbuckle assembly. This assembly includes with said forward section, the rearward section 26 and the intermediate connecting section 28. The end sections are provided with internally threaded bores which receive the threaded ends of the intermediate section. Thus, the total length of the turnbuckle assembly may be adjusted by proper manipulation of the intermediate section, in well known manner.

The rearward section of the turnbuckle assembly also is provided with a socket which rotatably receives the ball 30 projecting laterally from the upstanding segment 32' of the arm 32 of a bell crank lever. This bell crank lever is mounted rotatably intermediate its ends on the pivot pin 34. The pin is supported at its lower end on the mounting plate 36 and at its upper end by the upwardly struck segment 36' of the mounting plate. The bell crank lever is supported against movement along the pin by means of the spacer sleeve 38.

The mounting plate is secured to the vehicle floor board by means of the bolts 40, being adjusted to proper position by means of the spacer sleeves 42.

The other arm 44 of the bell crank lever extends rearwardly for operative engagement with the sensing valve 46 secured to the mounting plate.

It is to be noted from FIG. 1 that as the overlay pedal is pivoted in the counterclockwise direction through the braking zone B, the ball 30 is caused to move rearward along a straight line, reaching its limit of rearward movement when the overlay pedal contacts the accelerator pedal 14. This position is maintained substantially constant as the accelerator pedal is pivoted through the acceleration zone A.

Referring now to FIG. 3, the sensing valve 46 is formed of a pair of hollow tubes 50, 52 joined together by means of the interengaging threads. The outer end of the tube 50 is threaded internally to receive the threaded hollow section 54 of the adjustment nut 56. A damping piston 58 is mounted freely in the hollow section 54 for movement between the nut head 56 and the retainer ring 60 which is mounted removably in an annular groove in the section 54. A coil spring 62 is interposed between the piston and nut head and functions to urge the piston resiliently into abutment with the retainer ring. An annular cup seal 64 is carried by the piston to prevent the escape of air around the piston from the damping chamber 66 formed between the piston and the nut head. Controlled escape of air from this damping chamber is provided by the small opening 68 in the nut head, for purposes explained more fully hereinafter.

Mounted freely in the space adjacent the damping piston on the side of the latter opposite the damping chamber, is the enlarged head 70 of the loading rod 72. This head is provided with an internal groove 74 which is traversed by the pin 76. The groove registers with an elongated opening 78 in the wall of the tube 50, for the reception therethrough of the bell crank arm 44. The terminal end of this arm is bifurcated to provide the laterally spaced fingers 80 which straddle the pin.

The loading rod extends slidably through a cup seal 82 carried by the annular seal seat 84 which is secured removably to the tube 50 between the space retainer rings 86. An O-ring seal 88 is mounted in an annular groove in the seat 84, and functions with the cup seal 82 to prevent the passage of air from the space containing the head 70 to the high vacuum chamber 90 located on the side of the seat opposite the head.

The forward end of the loading rod 72 is threaded externally for removable attachment to the threaded bore of the loading piston 92 which carries the annular cup seal 94. This seal prevents the passage of air around the piston from the air chamber 96 to the high vacuum chamber 90. The air chamber 96 communicates with the atmosphere through the filter 96'.

The forward end of the loading rod 72 is provided with an internal bore 98 which communicates with the high vacuum chamber 90 through the radial opening 100. The bore also communicates with the bore 102 of the hollow vacuum tube 104 which is secured at its rearward end in the threaded bore of the loading piston 92. The vacuum tube extends slidably through the cup seal 106 carried by the annular seal seat 108 which is secured removably in the tube 52 between the spaced retainer rings 110. An O-ring seal 112 is mounted in an annular groove in a seal seat and functions with the cup seal 106 to prevent the passage of air from the air chamber 96 to the controlled vacuum chamber 114.

The forward end of the vacuum tube 104 is enlarged to form a retainer 116 for the annular resilient vacuum valve seal 118. The valve seat is confined within a hollow rearward extension 120 of the piston 122, for limited longitudinal movement between the retainer ring 124 and the piston face.

The valve seal 118 is associated with a vacuum valve seat 126 disposed freely in a central bore section provided in the piston 122. The seat is attached to one end of a valve stem 128 which extends freely through a restricted central bore in the piston and supports at its other end the air valve seat 130. This valve seat is associated with an annular resilient air valve seal 132 mounted on a piston and surrounding the valve stem 128.

The air valve seat 130 is disposed freely in a hollow forward extension 134 of the piston 122 and is urged resiliently into sealing engagement with its associated seal 132 by means of the coil spring 136. One end of this spring abuts the valve seat and the opposite end abuts the hollow plug 138 which is backed by the retainer ring 140.

The piston carries the annular cup seal 142 which functions to prevent the passage of air around the piston from the air chamber 144 to the controlled vacuum chamber 114. The air chamber communicates with the atmosphere through the filter 144' mounted on the disc cap 146 which is secured removably adjacent the outer end of the tube 52 between the spaced retainer ring 148.

The piston normally is held resiliently in the equilibrium position shown in FIG. 3 by means of the activator spring 150 and balance spring 152. One end of the activator spring abuts the rearward side of the piston and its opposite end abuts the fixed seal ring 108. One end of the balance spring 152 abuts the forward end of the piston and the opposite end abuts the fixed disc cap 146.

In the operation of the brake system described hereinbefore, let it be assumed that the high vacuum chamber 90 is connected through the conduit 154 to the intake manifold 156 of an internal combustion engine, that the controlled vacuum chamber 114 is connected through the conduit 158 to the inlet of the transducer valve 160, that the outlet of the transducer valve is connected to the vacuum operated diaphram drive system 162 of the power unit, and that the outlet of the hydraulic cylinder assembly 164 of the power unit is connected to the wheel cylinders which operate the brake bands associated with the brake drums attached to the vehicle wheels.

In the event the operator's foot is removed from the overlay pedal, the latter is caused to be moved upward to the position shown in FIG. 1. This movement results from movement of the loading rod 104 toward the right in FIG. 3, which effects counterclockwise rotation of the bell crank lever. Movement of the loading rod toward the right is by virtue of the differential pressure across the loading piston 92. The magnitude of this differential pressure is the difference between atmospheric pressure in the air chamber 96 and the negative pressure in high vacuum chamber 90 which is at the negative pressure of the intake manifold 156 of the engine.

Let it now be assumed that the overlay pedal 16 has been depressed from the position shown in FIG. 1 through the braking zone B to the position at which it rests in abutment with the conventional accelerator pedal 14. In rotating through this arc, the overlay pedal causes the bell crank lever to rotate clockwise (FIG. 2) and hence, through the engagement of the fingers 80 with the pin 76, effect movement of the components of the sensing valve 46 to the positions illustrated in FIG. 3. Under this condition the controlled vacuum chamber 114 is at atmospheric pressure, by communication with the air chamber 144 through the opening between the air seat 130 and seal 132. Further depressing of the overlay pedal to effect movement of the conventional accelerator pedal 14 through the acceleration zone A, serves merely to maintain the air valve seat and seal separated, since the bell crank lever has been moved substantially to its limit of clockwise rotation when the overlay pedal 16 first contacted the accelerator pedal.

It is to be noted here that, as the overlay pedal 16 is depressed through the acceleration zone A, the only force reacting against the foot is that provided by the spring loading (not shown) of the conventional accelerator pedal 14. This is achieved by virtue of the fact that, as the overlay pedal is rotated counterclockwise from the position shown in FIG. 1, the included angle formed between it and the turnbuckle assembly diminishes substantially to zero when the overlay pedal first contacts the accelerator pedal. Thus, the force exerted on the bell crank arm 44 by the loading rod pin 76 and tending to rotate the bell crank lever in the counterclockwise direction in FIG. 2, is sufficient merely to effect counterclockwise rotation of the overlay pedal to the position shown in FIG. 1.

When it is desired to apply braking force to the wheel brakes, the foot is retracted to permit the overlay pedal to move upward through the braking zone B. As the loading piston 92 moves toward the right, the air seat 130 closes against its seal 132 by the urging of spring 136. Further movement of the loading rod toward the right then causes separation of the vacuum seal 118 from its associated seat 126, whereupon communication is made between the high vacuum chamber 90 and the controlled vacuum chamber 114 through the vacuum tube bore 102 and radial opening 100.

The resultant vacuum in the control vacuum chamber produces a differential pressure across the piston 122, causing the latter to move toward the right against the opposing force of the activator spring 150. When the differential force across the piston 122 equals the opposing force of the activator spring, the system will regain equilibrium, with the air and vacuum seats closed against their respective seals.

As the overlay pedal 16 is permitted to retract further upward, the loading rod and vacuum tube are moved further toward the right, and new positions of equilibrium are attained with the piston 122 moved farther toward the right and the vacuum in the controlled vacuum chamber 114 increased progressively so that progressively increased hydraulic pressure is applied to the wheel brakes.

It is to be noted here that the force necessary to move the valve assembly is dependent upon the very small cross section area of the vacuum ring seal 118 and the differential pressure between the controlled vacuum chamber 114 and the atmospheric air chamber 96. Accordingly, since this force is quite small, the loading piston 92 may also be quite small, since it need only be large enough to load the overlay pedal 16 and to overcome the small frictional force exerted by the cup seals 82 and 106.

When the foot is removed completely from the overlay pedal, the loading rod head 70 moves toward the right into abutment with the damping piston 58 and forces the latter toward the right until it abuts the adjustment nut head 56. The latter may be screwed in or out of the tube 50 to adjust the length of movement of the loading rod. Thus, the maximum magnitude of vacuum in the controlled vacuum chamber 114 may be adjusted, with corresponding control of the maximum hydraulic pressure applied to the wheel brakes.

When a situation develops which requires an emergency or panic stop, the driver reacts instantaneously in removing his foot from the overlay pedal 16. The loading rod 72 and associated assembly moves unrestricted until the head 70 engages the damping piston 58. Accordingly, it is desirable that the adjustment nut 56 be adjusted so that when the loading rod head 70 has moved into abutment with the damping piston, the magnitude of vacuum in the controlled vacuum chamber 114 is such that the magnitude of hydraulic pressure applied to the wheel brakes provides the condition of impending skidding of the vehicle tires.

By keeping the foot off the overlay pedal, for example during a long high speed stop, the length of movement of the loading rod 72 toward the right is increased gradually as the air within the damping chamber 66 is permitted to escape slowly through the small opening 68. This further movement of the loading rod provides additional braking pressure to the wheel brakes to overcome the condition of brake fade which develops in most conventional brake systems during prolonged application of braking pressure. The time interval over which this ever increasing braking pressure is developed may be adjusted by proper selection of the size of opening 68 in the adjustment nut.

It is to be noted that, in the event the brake system of this invention is disconnected, by closing a valve in the conduit 154 leading from the engine manifold 156 to the high vacuum chamber 90, the opposed activator and balance springs 150, 152 function to move the components of the sensing valve to the equilibrium positions illustrated in FIG. 3. In this condition the bell crank lever is moved to its limit of clockwise rotation and the overlay pedal 16 is collapsed downward upon the conventional accelerator pedal 14. This eliminates the degree of slackness represented in FIG. 1 by the braking zone B, which otherwise would be present if the overlay pedal were loaded by means of spring pressure, either externally or by means of a spring interposed between the seal ring 108 and the loading piston 92. In this latter regard, if the overlay pedal is loaded externally for returning to the extended position shown in FIG. 3, the loading piston 92 may be omitted and the air filter 96' plugged to make the air chamber 96 a part of the high vacuum chamber 90.

The overlay pedal and sensing valve assembly described hereinbefore may also be utilized with a vehicle air brake system, such as is disclosed in our copending application Serial No. 756,682 filed August 22, 1958. In such event the air chambers 96 and 144 are connected to a source of high pressure air, vacuum chamber 90 is opened to the atmosphere, and controlled chamber 114 is connected to the air power unit.

It will be apparent to those skilled in the art that various additional changes in the details of construction and arrangement of parts described hereinbefore may be made without departing from the spirit of this invention and the scope of the appended claims.

Having now described our invention and the manner in which it may be used, what we claim as new and desire to secure by Letters Patent is:

1. For use on a vehicle having a floorboard and a fluid pressure wheel brake system including control means operable by a controlled variable fluid pressure to control the fluid pressure to the wheel brakes: the combination of a foot pedal, means for mounting the foot pedal pivotally on the floorboard, a mounting plate, means for detachably securing the mounting plate on the floorboard adjacent the foot pedal and on the same side of the floorboard as the pedal, bell crank lever means mounted pivotally on the mounting plate, adjustable link means pivotally interconnecting one arm of the bell crank lever means and the foot pedal, sensing valve means mounted on the mounting plate in operative engagement with the other arm of the bell crank lever means, the sensing valve means being operable by movement of said bell crank arm to produce a controlled variable fluid pressure output in proportion to said movement, and fluid pressure conduit means adapted to interconnect the sensing valve output and the brake system control means.

2. The combination of claim 1 wherein the sensing valve comprises a body having a first chamber arranged for communication with a source of elevated fluid pressure, a second chamber arranged for communication with a source of lower fluid pressure, a controlled fluid pressure chamber and an outlet therefor, piston means positioned between the first chamber and controlled fluid pressure chamber and movable under the influence of a differential fluid pressure in said chambers, the piston having an opening therethrough interconnecting the first chamber and controlled fluid pressure chamber, first valve means associated with the piston opening and movable relative to the piston for releasably sealing the piston opening, movable conduit means interconnecting the controlled fluid pressure chamber and second chamber, second valve means movable with the first valve means and associated with the conduit means for releasably sealing the latter, and means operatively interengaging the conduit means and bell crank lever arm for moving the conduit means relative to the second valve means.

3. The combination of claim 2 wherein the first chamber is arranged for communication with the atmosphere, the second chamber is arranged for communication with the intake manifold of an internal combustion engine as a source of vacuum, and the brake system control means is operable by a controlled variable vacuum.

4. The combination of claim 2 including a damping chamber in the sensing valve body, and a piston in the damping chamber arranged for operative engagement by the movable conduit means and operable to delay movement of the conduit means over a portion of its movable range in the direction unsealing the second valve means.

5. The combination of claim 2 including a loading piston in the sensing valve body operatively connected to the movable conduit means and interposed between the second chamber and a third chamber arranged for communication with a source of elevated fluid pressure for urging the movable conduit means in the direction unsealing the second valve means.

6. For use on a vehicle having a floorboard and a fluid pressure wheel brake system including control means operable by a controlled variable fluid pressure to control the fluid pressure to the wheel brakes and also having an accelerator pedal mounted on the floorboard for use by the operator: the combination of an overlay foot pedal, means for mounting the overlay foot pedal pivotally on the floorboard above and independently of the accelerator pedal, a mounting plate means for detachably securing the mounting plate on the floorboard adjacent the overlay pedal and on the same side of the floor board as the overlay pedal, bell crank lever means mounted pivotally on the mounting plate, adjustable link means pivotally interconnecting one arm of the bell crank lever means and the overlay foot pedal, sensing valve means mounted on the mounting plate in operative engagement with the other arm of the bell crank lever means, the sensing valve means being operable by movement of said bell crank arm to produce a controlled variable fluid pressure output in proportion to said movement, and fluid pressure conduit means adapted to interconnect the sensing valve output and the brake system control means.

7. The combination of claim 6 wherein the connection of the link means and bell crank arm is so located in relation to the connection of the link means and overlay foot pedal that the included angle formed between the overlay foot pedal and link means decreases substantially to zero as the foot pedal is depressed into engagement with the underlying accelerator pedal.

8. A sensing valve comprising a body having a first chamber arranged for communication with a source of fluid pressure, a second chamber arranged for communication with a source of lower fluid pressure, a controlled fluid pressure chamber and an outlet therefor, piston means positioned between the first chamber and the controlled fluid pressure chamber and movable under the influence of a differential fluid pressure in said chambers, the piston having an opening therethrough interconnecting the first chamber and controlled fluid pressure chamber, first valve means associated with the piston opening and movable relative to the piston for releasably sealing the piston opening, movable conduit means interconnecting the controlled fluid pressure chamber and second chamber, second valve means movable with the first valve means and associated with the conduit means for releasably sealing the latter, and movable operating means operatively engaging the conduit means for moving the latter relative to the second valve means.

9. The sensing valve of claim 8 including a damping chamber in the body, and a piston in the damping chamber arranged for operative engagement by the movable conduit means and operable to delay movement of the conduit means over a portion of its movable range in the direction unsealing the second valve means.

10. The sensing valve of claim 8 including a loading piston operatively connected to the movable conduit means and interposed between the second chamber and a third chamber arranged for communication with a source of elevated fluid pressure for urging the movable conduit means in the direction unsealing the second valve means.

11. The sensing valve of claim 8 wherein the first chamber is arranged for communication with the atmosphere and the second chamber is arranged for communication with a source of vacuum.

References Cited in the file of this patent

UNITED STATES PATENTS

| | | |
|---|---|---|
| 1,964,764 | Lippert | July 3, 1934 |
| 2,121,555 | Von Behren | June 21, 1938 |
| 2,642,165 | Banker | June 16, 1953 |